United States Patent [19]
Lehureau et al.

[11] Patent Number: 5,168,485
[45] Date of Patent: Dec. 1, 1992

[54] DEVICE FOR OPTICALLY READING OPTICAL RECORDING MEDIUM

[75] Inventors: Jean-Claude Lehureau, Ste Genevieve des Bois; Bruno Mourey, Boulogne Billancourt; Henriette Magna, Antony, all of France

[73] Assignee: Thomson-CSF, Puteaux, France

[21] Appl. No.: 731,428

[22] Filed: Jul. 17, 1991

Related U.S. Application Data

[63] Continuation of Ser. No. 492,552, Mar. 12, 1990, abandoned, which is a continuation of Ser. No. 145,764, filed as PCT/FR87/00102, abandoned.

[30] Foreign Application Priority Data

Apr. 11, 1986 [FR] France ................................ 86 05239

[51] Int. Cl.$^5$ ............................................. G11B 7/135
[52] U.S. Cl. ................................... 369/44.12; 369/110
[58] Field of Search ............... 369/44.11, 44.12, 44.23, 369/44.24, 110, 112; 250/201.5

[56] References Cited

U.S. PATENT DOCUMENTS

| | | | |
|---|---|---|---|
| 4,771,411 | 9/1988 | Greve | 369/44.23 |
| 4,805,992 | 2/1989 | Maeda | 369/44.23 |
| 4,824,191 | 4/1989 | Kato et al. | 369/44.12 |
| 4,945,529 | 7/1990 | Ono et al. | 369/44.12 |
| 5,051,974 | 9/1991 | Taniguchi et al. | 369/44.12 |
| 5,077,723 | 12/1991 | Yoshimatsu | 369/110 |

FOREIGN PATENT DOCUMENTS

| | | | |
|---|---|---|---|
| 61-230634 | 10/1986 | Japan | 369/44.23 |
| 62-26654 | 2/1987 | Japan | 369/44.23 |

Primary Examiner—Donald McElheny, Jr.
Attorney, Agent, or Firm—Roland Plottel

[57] ABSTRACT

A device for optically reading a recording medium is provided, in which a polarization beam separator includes a transparent plate having a phase network associated with a birefringent material, the refraction index of this material having a first refraction index for the polarization of an incident beam and a second refraction index for the polarization of a reflected beam. Thus, in accordance with the embodiment, the detection devices are placed substantially along the emission axis of the optical source.

27 Claims, 7 Drawing Sheets

FIG_1
PRIOR ART

FIG_2

FIG_3

FIG_4

FIG_5

FIG.4a

FIG_8

FIG_9

FIG_10

FIG_11

FIG_12

DEVICE FOR OPTICALLY READING OPTICAL RECORDING MEDIUM

This application is a continuation of application Ser. No. 07/492,552 filed Mar. 12, 1990, abandoned, which is a continuation of Ser. No. 07/145,764 filed Dec. 9, 1987, abandoned, which claims the benefit of PCT International Application No. PCT/FR87/00102, filed Mar. 31, 1987.

BACKGROUND OF THE INVENTION

1. Field of the Invention

The invention relates to a device for optically reading an optical recording medium applicable more particularly to the optical heads for reading optical disks designated in the trade by expressions such as compact disks, video disks or digital optical disks.

2. Description of the Prior Art

Figure 1:
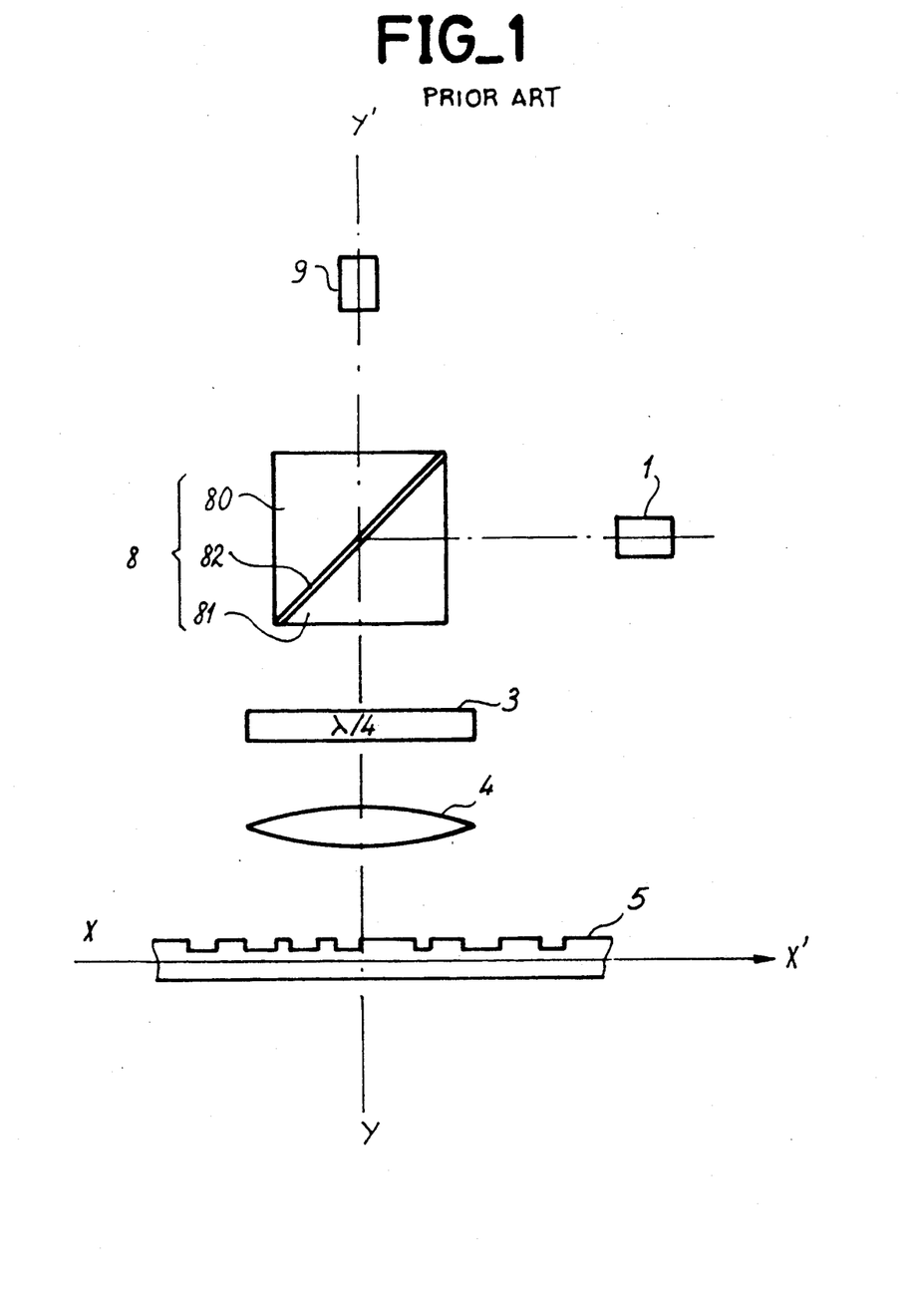
FIG. 1, an optical reading device of the prior art which has already been described.

An optical disk reading device of a known type includes at least, as shown in FIG. 1:
a laser source emitting a linearly polarized light beam 1;
a polarization separator element 8;
a quarter wave plate 3;
a focusing objective 4;
and an assembly of signal and positioning error detectors 9.

In the prior art, the polarization separator element is a glass cube having in its median plane a superimposition of thin dielectric layers 82 reflecting a tangentially polarized wave and transmitting a sagittally polarized wave.

The laser source 1 emits a light wave whose polarization is such that the beam is reflected, by the polarization separator, to the quarter wave plate 3. The beam is then transformed into a circularly polarized beam and is focused by lens 4 on disk 5. Depending on the information met on disk 5, the beam is reflected with a phase shift. The quarter wave plate 3 then transforms the circularly polarized beam into a linearly polarized light beam. The beam obtained is retransmitted by the separator cube 8 to the detector assembly 9 which may, in FIG. 1, be a photodetector. The amount of light detected by the photodetector depends on the size of the phase shift introduced by disk 5 and so on the amount of light retransmitted by the separator cube 8.

Such a system has different drawbacks. First of all, the positioning of the detector assembly 9 with respect to source 1 and disk 5 through the separator cube 8 is difficult to achieve. Such positioning involves tolerances of a few microns as regards the position of the separator cube.

In addition, such a separator cube is costly.

Finally, the assembly thus described is relatively space consuming.

The invention overcomes these three types of drawbacks by providing an inexpensive optical reading device which is compact and whose design involves no constraints as regards mounting and positioning of the elements with respect to each other.

SUMMARY OF THE INVENTION

This is why the invention relates to a device for optically reading an optical recording medium including:
a laser source emitting, along a given axis, a first linearly polarized beam and of given wave length;
a separator receiving the first beam and retransmitting it in the form of a second beam:
a focusing lens which focuses this second beam in the form of a fourth reading beam;
a recording medium receiving the fourth reading beam and reflecting it in the form of a fifth beam to the focusing lens, and the beam separator which retransmits at least one detection beam;
at least one detection device receiving the detection beam and delivering at least one electric signal representing the detection performed;
wherein the beam separator includes a phase network including means inducing an effect of astigmatism in the detection beam.

The invention also relates to a optical reading device of an optical recording medium including:
a laser source emitting, along a given axis, a first linearly polarized beam of given wave length;
a polarization beam separator receiving the first beam and retransmitting it in the form of a second beam to a quarter wave plate which in exchange transmits a third circularly polarized beam;
a focusing lens which focuses this third beam in the form of a fourth reading beam;
a recording medium receiving the fourth reading beam and reflecting it in the form of a fifth beam to the focusing lens, the quarter wave plate and the polarization beam separator which retransmits at least one detection beam;
at least one detection device receiving the detection beam and delivering at least one electric signal representing the detection performed;
wherein the polarization beam separator includes a phase network between a first medium and a second medium at least one of which is birefringent, the indices of the two media being equal for the linear polarization of the first beam.

BRIEF DESCRIPTION OF THE DRAWINGS

The different objects and characteristics of the invention will be clearer from the following description with reference to the accompanying Figures which show.

DETAILED DESCRIPTION OF THE INVENTION

FIG. 1 relates to an optical reading head of the prior art such as described above. It is apparent that the position of the laser source 1 and orientation thereof with respect to the beam separator device 8, shown in the form of a separator cube, are delicate to adjust. Similarly, the position of the photodetector 9 with respect to the beam reflected by disk 5 and therefore with respect to the assembly formed by the laser source 1, the separator cube 8 and disk 5 must be precise. It follows that, with the position adjustments made, they must no longer be subject to modifications caused for example by thermal expansions. The case, not shown in the Figure, which contains the different elements of FIG. 1, must therefore be made from a material which may be machined with high precision and having substantially no expansion or deformation under the effect of temperature variations. This is why the device of the Figure leads to a relatively expensive optical reading disk reading head.

Figure 2:
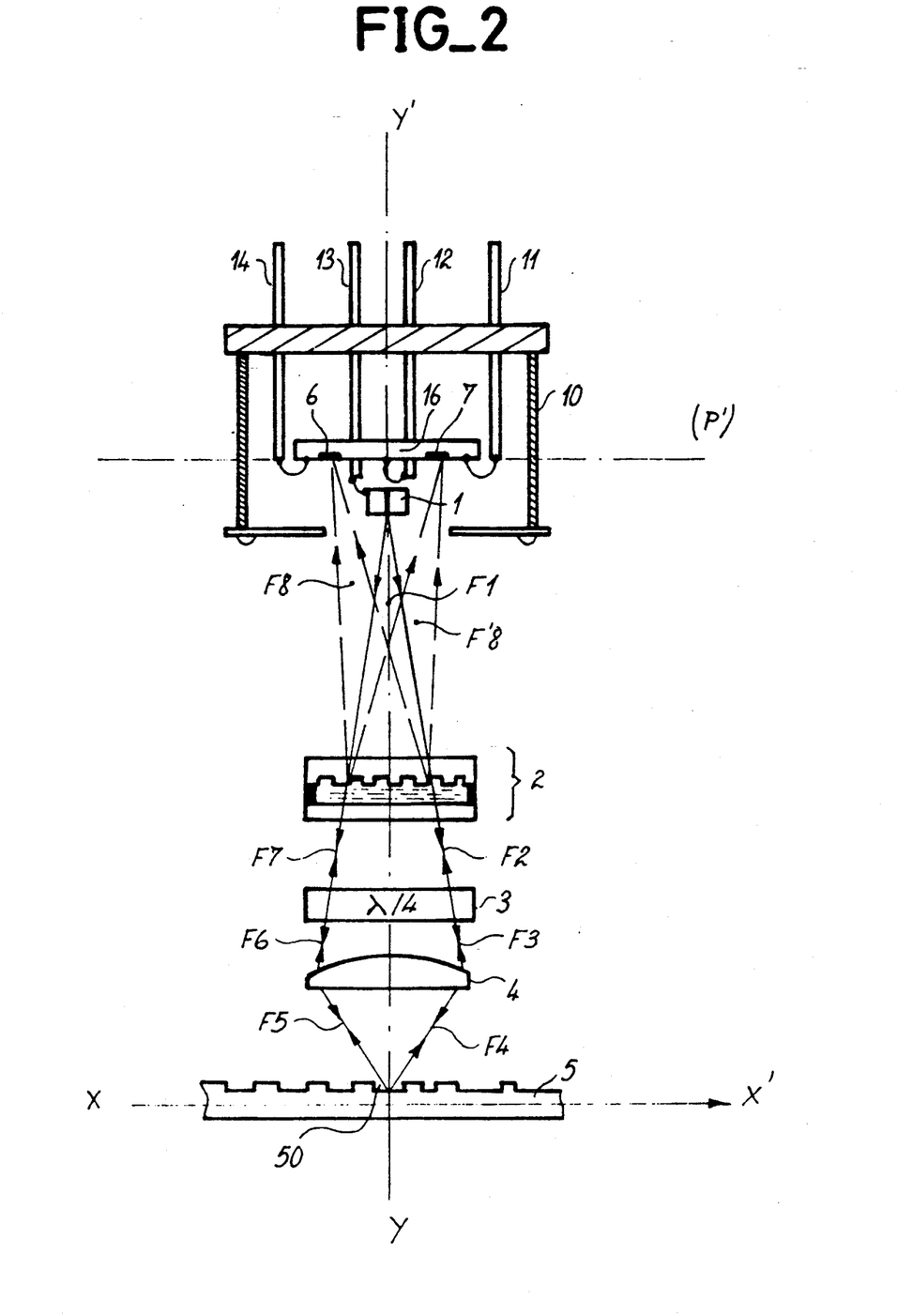
FIG. 2, one embodiment of an optical reading device of the invention.

According to the invention, the different elements of the optical reading head shown in FIG. 2 are aligned along the same axis YY' perpendicular to the plane of the recording medium or optical disk 5.

In FIG. 2, the optical reading device and disk 5 have been shown in section. The information on the disk moves along an axis XX'. The axis YY' of the optical reading device is perpendicular to axis XX'.

The reading device includes:
a light source such as a laser source 1 placed on axis YY' and emitting, along this axis YY', a linearly polarized light beam F1;
polarization beam separator 2 having a phase network situated at the interface of two media one of which is not birefringent and the other of which is birefringent. This beam separator is placed perpendicular to beam F1. It retransmits a beam F2 and does not influence the transmission because of the type and direction of polarization of the light. On the other hand, as will be described subsequently, after reflection from the optical disk the beam will be subjected to refraction;
a quarter wave plate 3 receiving the linearly polarized beam F2 and retransmitting a circularly polarized beam F3;
a lens 4 focusing the beam F3 in the form of a beam F4 so as to project a reading beam on the optical disk 5;
the optical disk 5 whose information such as 50 is mobile along the axis XX' and passes successively under the reading beam F4;
detection devices 6 and 7 placed in a non conjugate plane P of the plane of the disk, in the vicinity of the laser source 1, on each side of the axis YY', and aligned in a direction parallel to the axis XX', namely parallel to the direction of movement of the information on disk 5.

Figure 3:
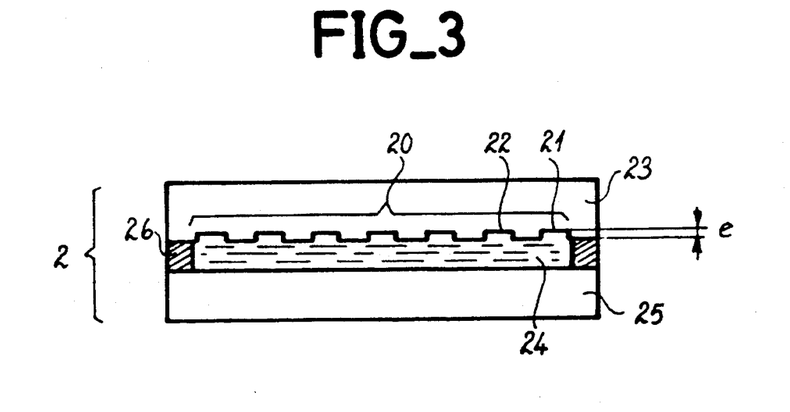
FIG. 3, one embodiment of a polarization beam separator of the invention.

The beam separator 2 is formed, for example, as shown in FIG. 3.

It has a transparent plate 23, made for example from glass, having a network 20 of grooves such as 21 and 22. Parallel to plate 23 is situated a plate 25, also transparent and made from glass for example, defining with plate 23 a space which is filled with a birefringent material 24 such as a liquid crystal. A seal 26 maintains the liquid crystal between the two plates.

With the refraction index of the medium forming plate 23 $n_o$, the birefringent material 24 is chosen so that, for the polarization of the beam F2 which it receives, its refraction index is also $n_o$.

On the other hand, for the polarization of beam F7 reflected by the optical disk 5, the index $n_o$ of the medium forming plate 23 and the index $n_e$ forming the birefringent medium are different.

The depth of etching of the network is preferably such that the diffraction order O of beam F7 is cancelled out. That is to say if:
e = the etching depth
$\Delta n$ = the index difference between the indices $n_o$ and $n_e$
$\lambda$ = the wave length of the light beam emitted by the laser source.
we have:

$$e \times \Delta n = \lambda/2.$$

Another embodiment of the beam separator 2 consists in forming a network by pressing or photoetching a glass or polymer having a typical index $n_o = 1.5$. This glass is used for closing the liquid crystal cell in which the axis of orientation of the molecules is parallel to the scores of the network.

For the liquid crystal a eutectic mixture may for example be used such as the one known under the commercial name E7 and manufactured by the firm BDH Chemicals Ltd (United Kingdom). The ordinary index of this liquid crystal is substantially equal to $n_o = 1.5$. Its birefringence refraction index $n_e$ is about 1.725. Namely an index difference between the two media 23 and 24 of 0.225.

Thus, considering an operating wave length of 0.8 $\mu$m, the depth e of the grooves 21, 22 of the network 20 must be chosen equal to 1.77 $\mu$m. the pitch of the grooves is typically equal to 10 $\mu$m.

The orientation of the molecules parallel to the glass plates is obtained by a conventional treatment of the rubbed polymer type.

The liquid crystal may be replaced by any other birefringent material (for example oriented polymer, or polymer having a liquid crystal phase at high temperature). In this latter case, the orientation of the polymer chains, parallel to the etchings, would be obtained by passing into the nematic phase at high temperature, this orientation being kept during cooling to the polymer phase.

The photodetectors 6 and 7 are integrated on the same assembly or chip 16 made preferably from silicon. This silicon chip 16 may include a central detector (not shown in the Figure, for regulating the power emitted by the laser source. The purpose of the photodetectors 6 and 7 is to detect the radial and vertical positioning errors and to read the signal carried by the disk.

Chip 16 and source 1 may be assembled together in the same case and prepositioned with respect to each other. Lens 4 may be moved separately or integrally with the rest of the assembly so as to follow the radial and vertical errors.

The laser source 1 and the elements of chip 16 such as photodetectors 6 and 7 are connected, by electric connections 11, 12, 13; 14, to external circuits not shown.

The operation of the optical reading device thus described is such that a reading beam F4 is reflected by disk 5 in the form of a beam F5. In the absence of information on disk 5, after transmission by lens 4, the quarter wave plate 3 and separator 2, beam F5 gives rise to two diffracted beams F8 and F8' symmetrical with respect to the axis YY' and of the same intensity. These beams reach the chip 16 at the position of detectors 6 and 7 which detect a certain amount of light.

If the beam F4 strikes disk 5 at the position of an information signal, the beam undergoes a phase shift in its polarization. This results in a different diffraction by the polarization separator 2. A part of the light from beams F8 and F8' does not reach the photodetectors 6 and 7. They then detect less light.

In a first embodiment, the grooves 21 and 22 of network 20 are rectilinear and parallel.

Figure 4:
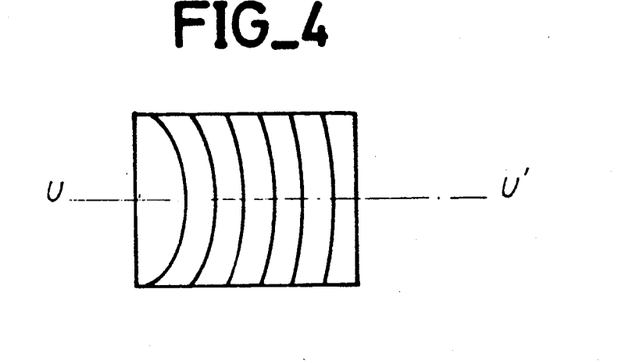
FIG. 4, a top view of one embodiment of a beam separator of the invention.
Figure 4A:
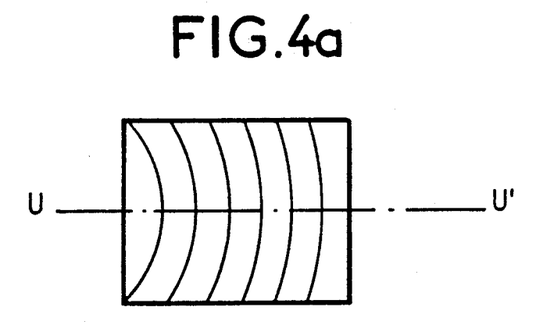
FIG. 4a, a top view similar to FIG. 4 but showing another embodiment of a beam separator of the invention.

Another embodiment of the beam separator is a network of grooves wherein the network is concentric circular grooves as shown in FIG. 4a.

However, it is possible to give them an elliptic form so as to introduce an astigmatism. The network then has a configuration such as shown in FIG. 4 with concentric ellipse portions one of the axes of which is UU'.

Figure 5:
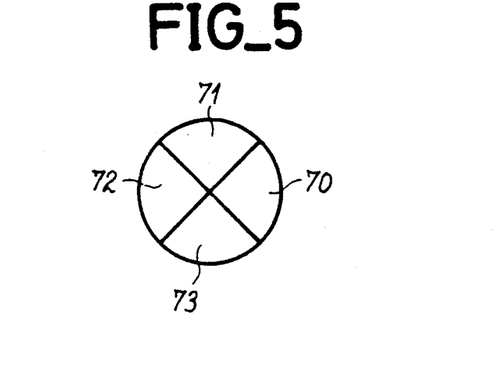
FIG. 5, one embodiment of a photodetector adapted to the reading device of the invention.

In connection with this elliptic network, one of the photodetectors 7, for example, includes four photodetectors 70, 71, 72, 73 disposed in a cross in the plane P' as shown in FIG. 5.

If the disk 5 is at a correct distance from lens 4, the diffracted beam F8' reaches the photodetectors 70, 71, 72 and 73 in the form of a circle and illuminates each detector in an equivalent way.

If the distance of disk 5 with respect to lens 4 differs with respect to the preceding case, or if lens 4 is moved along axis YY', beam F8' then projects onto the photodetectors 70 to 73 an image of elliptic shape one of the axes of which will be parallel to the axis UU'. For example, if the lens 4 is too close to disk 5, the large axis of the elliptic image on the photodetectors 70 to 73 will be parallel to the axis UU' and two photodetectors 70 and 72 for example, would receive more light than the other two photodetectors 71 and 73. Conversely, if the lens is too far away from disk 5, the large axis of the image on the photodetectors will be perpendicular to the axis UU' and it is then the two photodetectors 71 and 73 which will receive more light than photoconductors 70 and 72.

The astigmatism of network 20 may be increased by slanting the separator 2 with respect to the axis YY'.

A network 20 may also be provided whose grooves are circular and concentric. Then separator 2 is slanted with respect to axis YY' so as to give an astigmatism effect to the circular shaped network 20.

Figure 6:
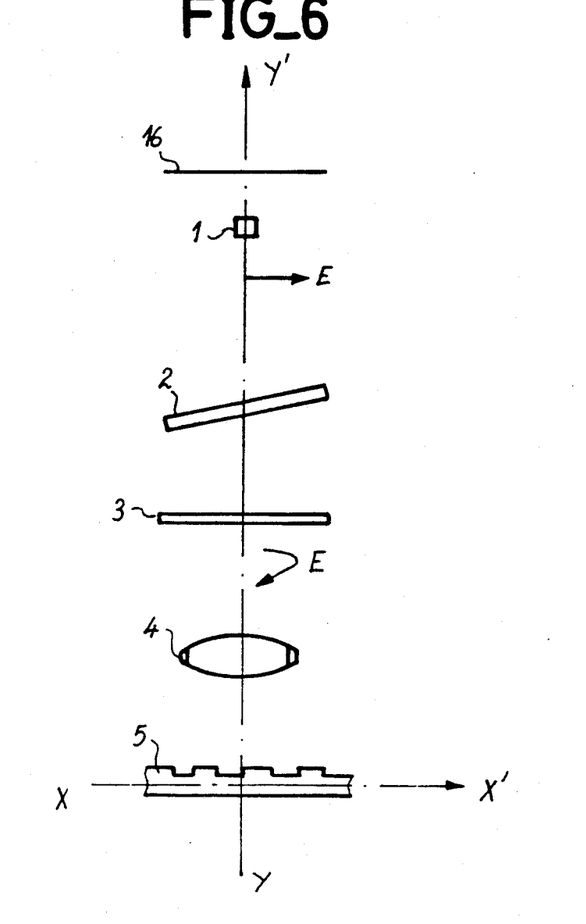
FIG. 6, one example of a reading device of the invention.

Such a slant of separator 2 is shown in FIG. 6.

It is also possible, for introducing astigmatism, to slant the chip 16 carrying the photodetectors with respect to the axis YY'. Such an arrangement is not shown in the Figures but is of the same kind as that shown in FIG. 6.

Figure 7:
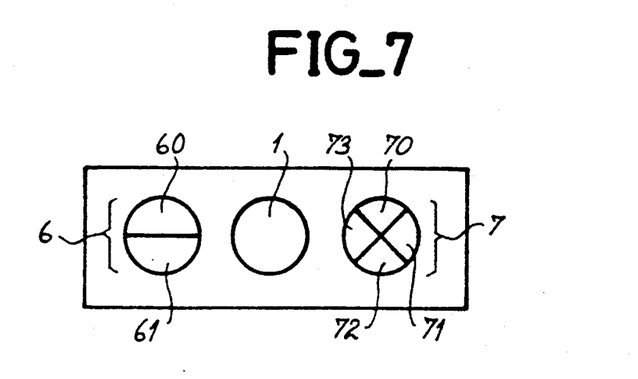
FIG. 7, one embodiment of photodetectors and of a laser diode adapted to the reading device of the invention.

The photodetector 6 may also include several photodetectors. It may more particularly include two photodetectors 60, 61 aligned in a direction orthogonal to the direction of travel of the information on the disk (axis XX').

These photodetectors 60 and 61 are placed so that, when beam F4 is centered with respect to a track of disk 5, they both receive the same amount of light.

The photodetectors 60 and 61 then operate in a push-pull mode and serve for radially slaving the axis YY' of the reading device with respect to an information track on disk 5.

The combination of photodetectors 70 to 73 for adjusting the focusing of the reading beam on disk 5, and photodetectors 60, 61 for radially slaving the reading beam on the disk, give an assembly shown, in FIG. 7, in a bottom view. In this Figure, there are provided on each side of the laser source 1, the four photodetectors 70 to 73 disposed in a cross and the two photodetectors 60 and 61 joined together side by side.

Integration of the light intensity readings provided by these different photodetectors allows, besides their above described adjustment functions, the information written on the disk to be detected.

In the preceding description one embodiment has been described in which the beam separator is a polarization beam separator and more particularly a separator having a birefringent medium.

The system thus described also operates with a beam separator 2 not having any birefringent medium.

Figure 8:
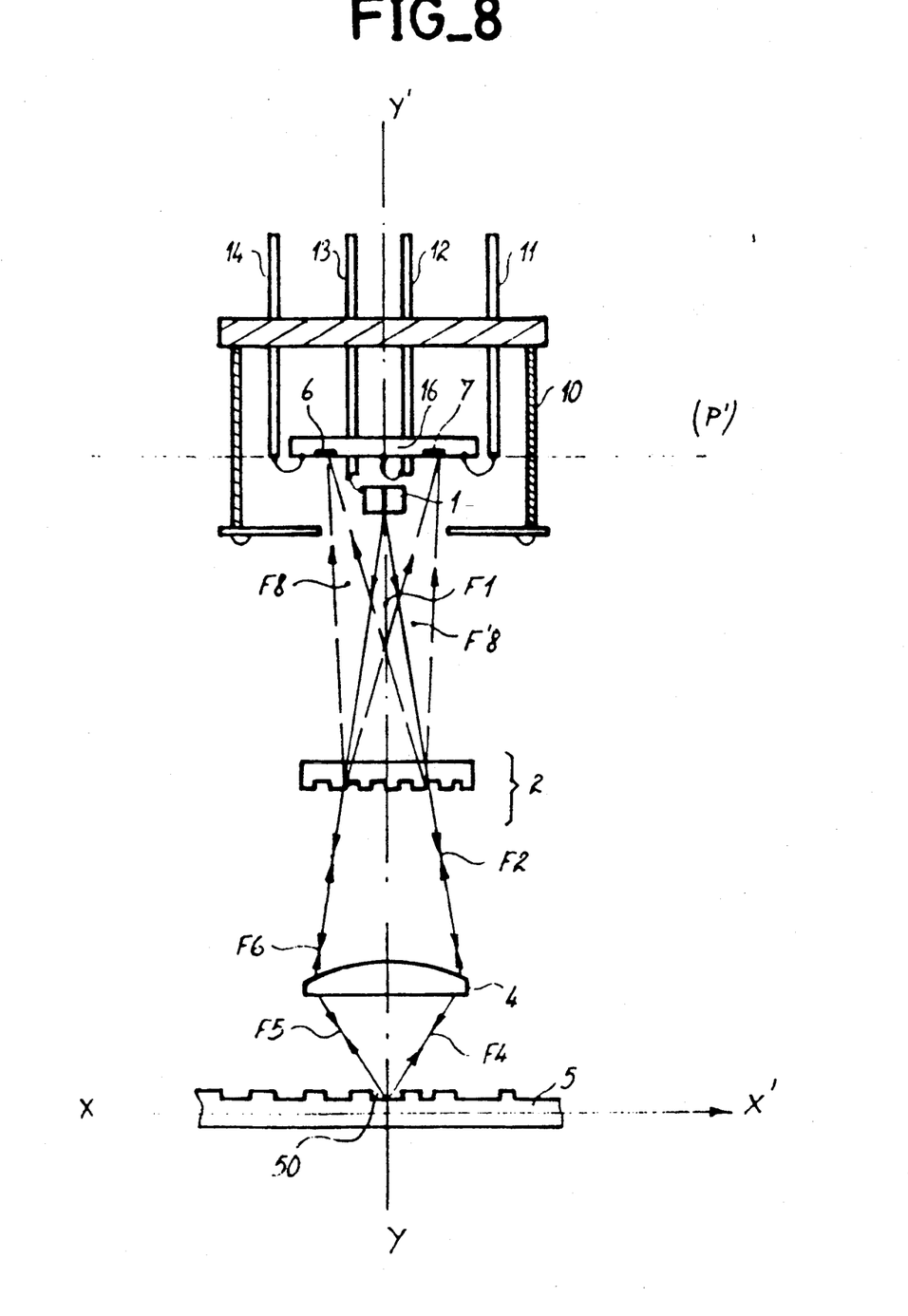
FIG. 8, another embodiment of an optical reading device of the invention.
Figure 9:
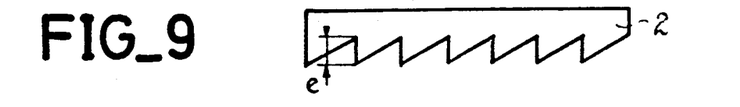
FIGS. 9, and 10, embodiments of beam separators without birefringent medium.

FIG. 8 shows one embodiment of the device of the invention. In this embodiment having a configuration similar to that of FIG. 2, the beam separator 2 is formed by a transparent plate whose refraction index (n) is different from that of the medium situated on each side of the separator 2. In addition, the separator 2 includes a network of grooves.

The device of the FIG. 8 does not have a quarter wave plate. However, although it has not been shown, it is possible to provide one between the separator 2 and lens 4 for example. This quarter wave plate will then reduce the noise, if required, in the laser while avoiding reflecting back to the laser light of the same polarization.

The grooves of the network of separator 2 are, in the embodiment, parallel rectilinear grooves.

They may also be concentric circular grooves.

To introduce astigmatism, so as to operate as describe above with the four photodetectors 70, 71, 72, 73 of FIG. 5 disposed in a cross, the separator 2 is slanted with respect to the axis YY' of the device as is shown in FIG. 6.

The separator may then have rectilinear grooves and it is slanted counterwise to the diffraction so as to increase the astigmatism. Concentric circular grooves may also be provided which already introduce an astigmatism but, by slanting the separator, the astigmatism is accentuated.

The grooves may also be of an elliptic shape and a network then introduces an astigmatism like a slanted network of circular grooves.

The grooves may also have a triangular shaped section. More precisely, they may also have blazed grating shapes such as that shown in FIG. 2. The depth e of each tooth has then a value such that:

$e \cdot \Delta n \simeq \lambda$ $\Delta n$ being the difference of refraction indices of the separator 2 and the medium situated on each side, $\lambda$ being the length of the light waves.

Figure 10:
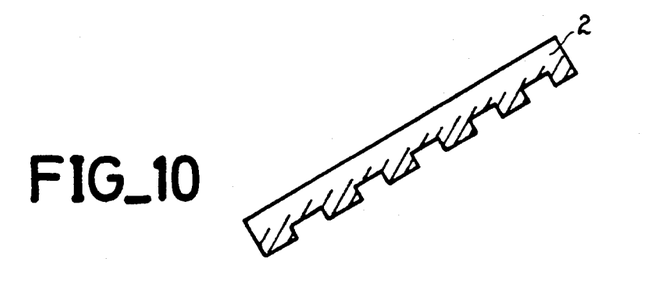

In a variant, shown in FIG. 10, the groove of networks of separator 2 may be reflecting, for example metallized.

Figure 11:
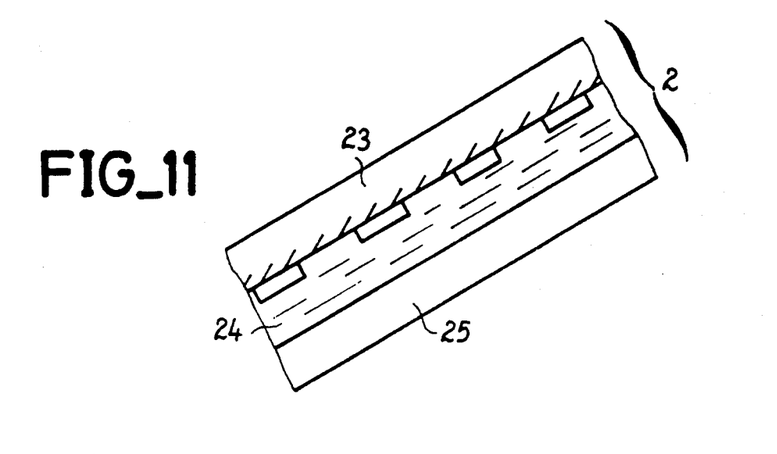
FIG. 11, another embodiment of a beam separator with birefringent medium and having a reflecting surface.

Similarly, in the case of a separator having a birefringent medium, a reflecting surface may be provided (hatched by slanted lines in FIG. 11).

Figure 12:
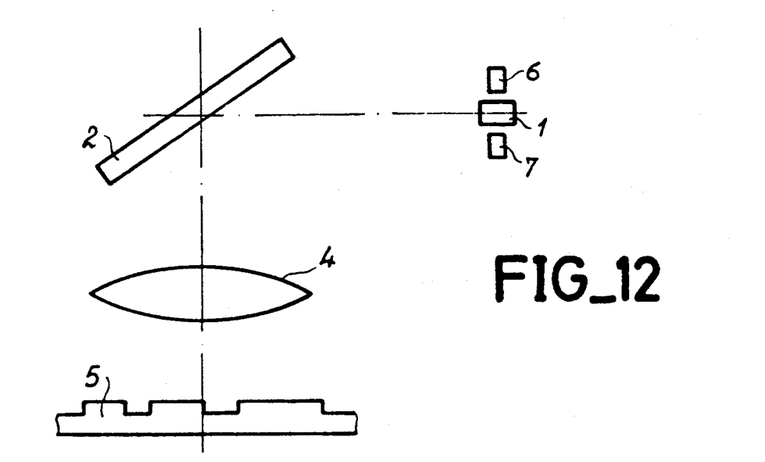
FIG. 12 a variant of an optical detector according to the invention.

FIG. 12 shows then the position of the separator in the detection device with respect to the laser source 1 and the detector 6, 7, on the one hand, and with respect to the recording medium 5 on the other. As can be seen, separator 2 then works by reflection and refraction and the operation is similar to that described above.

The optical reading device thus described may be constructed in a compact form with reduced dimensions with respect to known devices.

By way of example, the construction of the device of the invention leads to an optical reading device in which:

the aperture of the objective (or lens 4) is 5 mm;
the distance from the lens 4 to disk 5=5 mm;
the distance from lens 4 to the laser source 1 is 20 mm;
the distance from the laser source 1 to the plane of chip 16 is 1 mm;
the distance from a photodetector (6 or 7) to the axis YY' is 2 mm;
the diameter of case 10 containing the laser source 1 and chip 16 assembly is 9 mm.

These numerical values have only been given by way of example, to show the low space requirement of the reading device obtained. But it is obvious that another construction could lead to different dimensions.

What is claimed is:

1. A device for optically reading an optical recording medium comprising:
   a laser source (1) emitting, along a given axis (Y—Y'), a first linearly polarized beam (F1) of a given wave length (X);
   a beam separator (2) receiving the first beam and retransmitting it in the form of a second beam (F2);
   a focusing lens (4) which focuses the second beam (F2) in the form of the third reading beam (F4) intended for reading;
   a recording medium (5) receiving the third reading beam and reflecting it in the form of a fourth beam to the focusing lens (4), and to the beam separator which retransmits at least one first detection beam (F8');
   at least one first detection device (7) receiving the first detection beam (F8') and delivering at least one electric signal representing the detection performed;
   said beam separator (2) including a phase network having means for inducing an astigmatism in the first detection beam (F8'), the first detection device (7) sensing said astigmatism to provide said electric signal in accordance with the focusing of said third reading beam (F4) on said recording medium (5), said phase network including a transparent plate having an index of refraction (n) different from the medium surrounding said plate and carrying a network of concentric circular grooves.

2. The device as claimed in claim 1 wherein the beam separator (2) retransmits at least one second detection beam (F8) and wherein at least one second detection device (6) receives the second detection beam (F8).

3. The device as claimed in claim 1 or 69, wherein said beam separator (2) has an angle in relation to the first detection beam (F8') which is slanted counterwise to the diffraction of said first detection beam by said beam separator.

4. The device as claimed in claim 1, or 2 wherein said beam separator is a reflection grating.

5. A device for optically reading an optical recording medium comprising:
   a laser source (1) emitting, along a given axis (Y—Y'), a first linearly polarized beam (F1) of a given wave length (X);
   a beam separator (2) receiving the first beam and retransmitting it in the form of a second beam (F2);
   a focusing lens (4) which focuses the second beam (F2) in the form of a third intended for reading beam;
   a recording medium (5) receiving the third reading beam and reflecting it in the form of a fourth beam (F5) to the focusing lens (4), and then transmitted as a fifth beam (F7) to the beam separator which retransmits at least one first detection beam (F8');
   at least one first detection device (7) receiving the first detection beam (F8') and delivering at least one electric signal representing the detection performed;
   said beam separator (2) including a phase network having means for inducing an astigmatism in the first detection beam (F8'), the first detection device (7) sensing said astigmatism to provide said electric signal in accordance with the focusing of said third reading beam (F4) on said recording medium (5), wherein said phase network (20) is between a first medium (23) and a second medium (24) at least one of which is birefringent, the indices of the two media being equal for the linear polarization of the first beam (F1).

6. The optical reading device as claimed in claim 5, wherein said first medium includes a rigid transparent plate (23) having a first refraction index (no) and being formed with a network of grooves (20) serving as phase network; said second medium includes a birefringent material (24), applied to the network of grooves (20) and filling the grooves of this network, the refraction index of this birefringent material (24) having a first value equal to a first index (no) of the rigid transparent plate (23) for polarization of the second beam (F2) and having a second birefringent index value (ne) for polarization of said seventh beam (F7); and said polarization beam separator (2) includes a transparent plate (25) for maintaining the birefringent (24) material against said rigid transparent plate (23).

7. The optical reading device as claimed in claim 6 wherein said rigid transparent plate (23) in made from glass.

8. The device as claimed in claim 6, wherein said rigid transparent plate (23) is made from a polymer material.

9. The device as claimed in claim 6, wherein said birefringent material (24) is a liquid crystal in which the axis of the molecules are parallel to the grooves of the network of said rigid transparent plate (23).

10. The device as claimed in claim 6, wherein said birefringent material (24) is a polymer material in which the orientation of the molecules in obtained by rubbing said polymer material (24).

11. The device as claimed in claim 6, wherein said birefringent material (24) is a polymer material having a nematic liquid crystal phase at high temperature which phase is kept during cooling to the polymer phase.

12. The device as claimed in claim 6, wherein the depth (e) of said grooves is proportional to the emission wave length of said laser source and inversely proportional ot the difference of the indices of said rigid transparent plate and said birefringent material.

13. The device as claimed in claim 6, wherein, with said recording medium is situated in a plane (P), said first beam (F1) is perpendicular to the plane of said recording medium (5) and said beam separator (2) is placed in the path of said beam (F1).

14. The device as claimed in claim 6 wherein the grooves (20) of said transparent plate (23) are rectilinear and parallel.

15. The device as claimed in claim 6, wherein said grooves (20) are curves.

16. The device as claimed in claim 6, wherein said grooves (20) are concentric circle portions.

17. The device as claimed in claim 6, wherein said grooves (20) are concentric ellipse portions.

18. The device as claimed in claim 5, wherein said phase netword (20) is flat.

19. The device as claimed in claim 5, wherein said phase network (20) is perpendicular to the axis (YY') of said first beam (F1).

20. The device as claimed in claim 5, wherein said phase network (20) is slanted with respect to the axis (YY') of said first beam (F1).

21. The device as claimed in claim 5, wherein said detection device (7) is situated in the vicinity of said source (1), in a non conjugate plane of said recording medium, in the path of said detection beam (F8').

22. The device claimed in claim 13, wherein said detection device (7) is situated substantially along the axis (YY') of said first beam (F1).

23. The device as claimed in claim 5, wherein the beam separator (2) retransmits at least one second detection beam (F8') detected by at least one second detection device (6).

24. The device as claimed in claim 5 or 23, wherein said beam separator has an angle in relation to the at least first detection beam (F8') which is slanted counterwise to the diffraction of said at least first detection beam by said beam separator.

25. The device as claimed in claim 5, wherein said beam separator has at least one plane reflection means associated with the first medium (23).

26. The device as claimed in any of the previous claims 5, 6, or 23, wherein a quarter wave plate (3) is placed between the beam separator (2) and the focusing line (4).

27. The device as claimed in claim 5, wherein said recording medium is an optical disk.

* * * * *